Patented Mar. 7, 1950

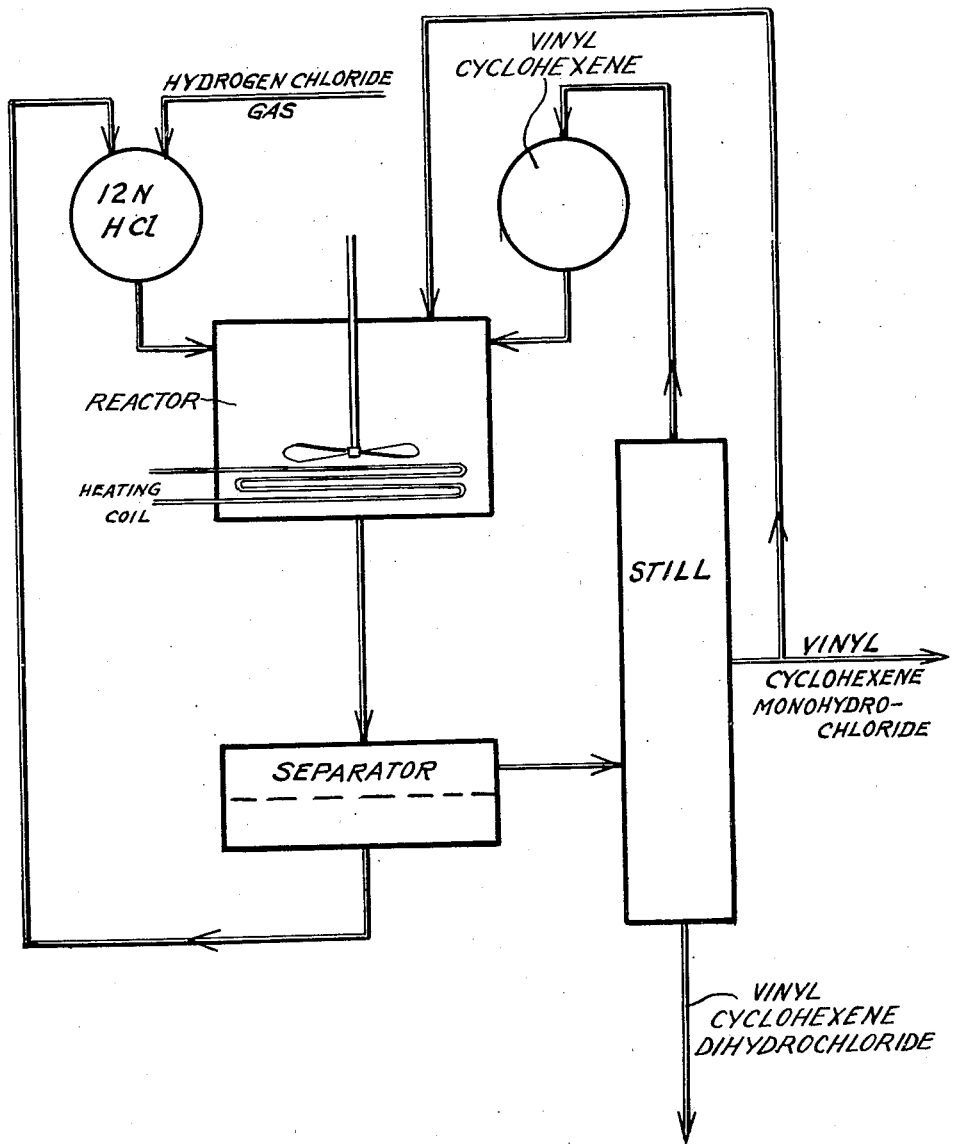

2,499,505

UNITED STATES PATENT OFFICE 2,499,505

VINYLCYCLOHEXENE HYDROCHLORIDES

Herbert L. Johnson, Media, and Archibald P. Stuart, Norwood, Pa., assignors to Sun Oil Company, Philadelphia, Pa., a corporation of New Jersey Application November 20, 1945, Serial No. 629,806

2 Claims. (Cl. 260—648)

This invention relates to the preparation of novel 1-vinylcyclohexene-3 derivatives, particularly those obtained upon the hydrochlorination of 1-vinylcyclohexene-3.

According to the invention 1-vinylcyclohexene-3 is contacted with aqueous concentrated hydrochloric acid at a temperature within the range 15° C.–120° C. for a time sufficient to form a mixture containing 1-vinylcyclohexene-3 monohydrochloride, 1-vinylcyclohexene-3 dihydrochloride, any unreacted 1-vinylcyclohexene-3 and aqueous hydrochloric acid. The mixture thus formed is treated to separate the desired product therefrom.

Depending upon the conditions employed, a preponderant proportion of 1-vinylcyclohexene-3 monohydrochloride can be made to form in the reaction mixture or a preponderant proportion of 1-vinylcyclohexene-3 dihydrochloride can be made to form in the reaction mixture. When 1-vinylcyclohexene-3 monohydrochloride is desired as the final product, any unreacted 1-vinylcyclohexene-3 can be recycled for further hydrochlorination. When 1-vinylcyclohexene-3 dihydrochloride is desired as the final product, any unreacted 1-vinylcyclohexene-3 and 1-vinylcyclohexene-3 monohydrochloride can be recycled for further hydrochlorination.

As stated, depending upon the conditions employed a preponderant proportion of 1-vinylcyclohexene-3 monohydrochloride or a preponderant proportion of 1-vinylcyclohexene-3 dihydrochloride will be formed.

The conditions for the formation of 1-vinylcyclohexene-3 monohydrochloride are as follows:

The temperature at which hydrochlorination is effected should be within the range 15° C.–120° C., preferably 55° C.–75° C. Concentrated hydrochloric acid, about 12 normal, should be used. Vigorous agitation is required to ensure intimate contact between 1-vinylcyclohexene-3 and the acid solution. It has not been found possible, within the stated temperature range, to hydrochlorinate 1-vinylcyclohexene-3 with anhydrous hydrogen chloride. Accordingly, a specific characteristic of the reaction of this invention is that it must be carried out employing a hydrochloric acid solution.

The volume ratio of hydrochloric acid to 1-vinylcyclohexene-3 employed will, of course, depend upon the concentration of the acid. When about 12 normal hydrochloric acid is employed the volume ratio will be about 0.64.

The conditions for the formation of 1-vinylcyclohexene-3 dihydrochloride are as follows:

The temperature at which hydrochlorination is effected should be within the range 50° C.–120° C., preferably 75° C.–110° C. Concentrated hydrochloric acid, about 12 normal, should be used. Vigorous agitation is required to ensure intimate contact between 1-vinylcyclohexene-3 and acid solution.

The volume ratio of hydrochloric acid to 1-vinylcyclohexene-3 will, of course, depend upon the concentration of the acid. When about 12 normal hydrochloric acid is employed the volume ratio will be about 5.15.

The reaction time will vary depending upon conditions of the operation employed. For example, at higher temperatures, within the stated ranges, the reaction appears to proceed more rapidly. Also, an increase of pressure appears to increase the rate of the reaction. Furthermore, vigorous agitation will aid in reducing the reaction time. Generally a time of about three hours has been required for completing substantially the desired reaction.

Although the reaction is to be effected employing a hydrochloric acid solution, for example, aqueous hydrochloric acid, it is to be understood that hydrogen chloride gas may be fed to a reactor containing 1-vinylcyclohexene-3 and water forming the hydrochloric acid in situ. The quantity of water present can vary greatly. Quantities of water present ranging from about 5% to about 80% of the total reaction mixture have been employed. Alcohol, ether or other compatible solvent can be employed to prepare the hydrochloric acid solution.

By proceeding as detailed above, employing 1-vinylcyclohexene-3, a monohydrochloride of 1-vinylcyclohexene-3 or a dihydrochloride of vinylcyclohexene can be obtained. The products of the invention are water white liquids. 1-vinylcyclohexene-3 monohydrochloride has a boiling point of 85° C.–87° C. at 38 mm. Hg and a refractive index of 1.4796 $n_D^{20°C}$. 1-vinylcyclohexene-3 dihydrochloride has a boiling point within the point of 85° C.–87° C. at 38 mm. Hg and a refractive index within the range 1.4887–1.4964 $n_D^{20°C}$: This indicates that more than one dihydrochloride is obtained in the process.

Yields as high as 45% of 1-vinylcyclohexene-3 monohydrochloride per pass, and as high as 54% on recycle, have been obtained. As high as 93% of 1-vinylcyclohexene-3 dihydrochloride per pass, and as high as 99.5% on recycle, have been obtained employing the process of the invention. In the following table are shown additional data to further illustrate the conditions and other factors employed.

| Ratio $\frac{HCl}{VCH}$ (molar) | Temp., °C. | Time, hrs. | HCl con'n eq./liter | Ratio $\frac{HCl}{VCH}$ | Yield Per Pass, Per Cent | | | Recycle Yield, Per Cent | | Ratio $\frac{VCH.HCl}{VCH.2HCl}$ |
|---|---|---|---|---|---|---|---|---|---|---|
| | | | | | VCH | VCH.HCl | VCH.2HCl | VCH.HCl | VCH.2HCl | |
| 2.0 | 65 | 5 | 12 | 1.79 | 29.7 | 43.6 | 26.7 | 62.0 | 38.0 | 1.6 |
| 1.0 | 65 | 5 | 12 | 1.29 | 64.4 | 26.1 | 9.5 | 72.8 | 27.2 | 2.7 |
| 0.5 | 65 | 5 | 12 | 0.644 | 80.1 | 15.9 | 4.0 | 80.3 | 19.7 | 4.1 |
| 0.5 | 90 | 5 | 12 | 0.644 | 74.3 | 18.0 | 7.7 | 70.3 | 29.7 | 2.4 |
| 0.5 | 65 | 2.5 | 12 | 0.644 | 88.0 | 5.8 | 6.2 | 49.7 | 50.3 | 1.0 |
| 0.5 | 65 | 5 | 9 | 0.644 | 89.9 | 6.4 | 3.7 | 63.5 | 36.5 | 1.7 |

In the drawing there is shown, schematically, a flow plan of apparatus which can be employed for the continuous production of 1-vinylcyclohexene-3 monohydrochloride and/or 1-vinylcyclohexene-3 dihydrochloride, as desired. The conditions of operation and the quantities of reactants employed are as above detailed.

1-vinylcyclohexene-3 and 12 normal hydrochloric acid solution are fed to the reactor until the same is about ⅔ full. Agitation is begun and the contents of the reactor is raised to the desired temperature which is maintained until the reaction has been substantially completed. At this stage, the reaction products are fed to the separator while additional quantities of 1-vinylcyclohexene-3 and hydrochloric acid solution are fed to the reactor. The flow is regulated so that the reactor is maintained about ⅔ full and so that the reactants will remain in the reactor for the desired reaction time. In the separator the reaction mixture is allowed to separate into two layers. The lower layer contains essentially hydrochloric acid solution which is recycled to storage where it is made up to the desired concentration by the addition of hydrogen chloride thereto. The upper layer consists essentially of 1-vinylcyclohexene-3, 1-vinylcyclohexene-3 monohydrochloride and 1-vinylcyclohexene-3 dihydrochloride and is fed to the still wherein it is fractionated into three streams; namely, any unreacted 1-vinylcyclohexene-3 which is returned to storage to be reused, 1-vinylcyclohexene-3 monohydrochloride which is withdrawn as a product, in the event it is the desired product, or which is recycled to the reactor when 1-vinylcyclohexene-3 dihydrochloride is the desired product and, finally, 1-vinylcyclohexene-3 dihydrochloride.

As stated, the products of the invention are water white liquids. These liquids have an oily consistency and appear to be useful as plasticizers and as intermediates for further chemical reaction.

It will be understood to those versed in the art that variation and modification are possible within the spirit of the invention the essence of which is that new derivatives of 1-vinylcyclohexene-3 have been obtained, particularly hydrochlorides of 1-vinylcyclohexene-3, and that a process for the preparation of these compounds by hydrochlorination of 1-vinylcyclohexene-3, under the specific conditions and in the manner aforesaid, have been set forth.

We claim:

1. A process for the preparation of the monohydrochloride of 1-vinylcyclohexene-3 which comprises contacting, with vigorous agitation, 1-vinylcyclohexene-3 with about 12 normal aqueous hydrochloric acid, for from about 2.5 to about 5 hours while maintaining the reaction mixture at a temperature of from about 55° C. to about 75° C., the reactants being present in an amount such that the volume ratio of said hydrochloric acid to said 1-vinylcyclohexene-3 is about 0.64, and separating the monohydrochloride of 1-vinylcyclohexene-3 from the reaction mixture.

2. A process for the preparation of the monohydrochloride of 1-vinylcyclohexene-3 which comprises contacting with vigorous agitation, 1-vinylcyclohexene-3 with about 12 normal aqueous hydrochloric acid solution at a temperature of from about 55° C. to about 75° C., the reactants being present in an amount such that the ratio of said hydrochloric acid to said 1-vinylcyclohexene-3 is from about 0.6 to about 1.8, and separating the monohydrochloride of 1-vinylcyclohexene-3 from the reaction mixture.

HERBERT L. JOHNSON.
ARCHIBALD P. STUART.

REFERENCES CITED

The following references are of record in the file of this patent:

UNITED STATES PATENTS

| Number | Name | Date |
|---|---|---|
| 2,401,414 | Doumani et al. | June 4, 1946 |

FOREIGN PATENTS

| Number | Country | Date |
|---|---|---|
| 268,722 | Germany | Dec. 29, 1913 |
| 343,116 | Great Britain | Feb. 16, 1931 |

Certificate of Correction

Patent No. 2,499,505                                                                    March 7, 1950

HERBERT L. JOHNSON ET AL.

It is hereby certified that errors appear in the printed specification of the above numbered patent requiring correction as follows:

Column 2, line 50, strike out "point of 85° C.-87° C. at 38 mm." and insert instead *range 85° C.-110° C. at 10 mm.*; column 4, line 32, for "750° C." read *75° C.*; and that the said Letters Patent should be read with these corrections therein that the same may conform to the record of the case in the Patent Office.

Signed and sealed this 1st day of August, A. D. 1950.

[SEAL]

THOMAS F. MURPHY,
*Assistant Commissioner of Patents.*